No. 834,002. PATENTED OCT. 23, 1906.
F. S. DERR.
SLATE CUTTING MACHINE.
APPLICATION FILED MAR. 1, 1905.
2 SHEETS—SHEET 1.
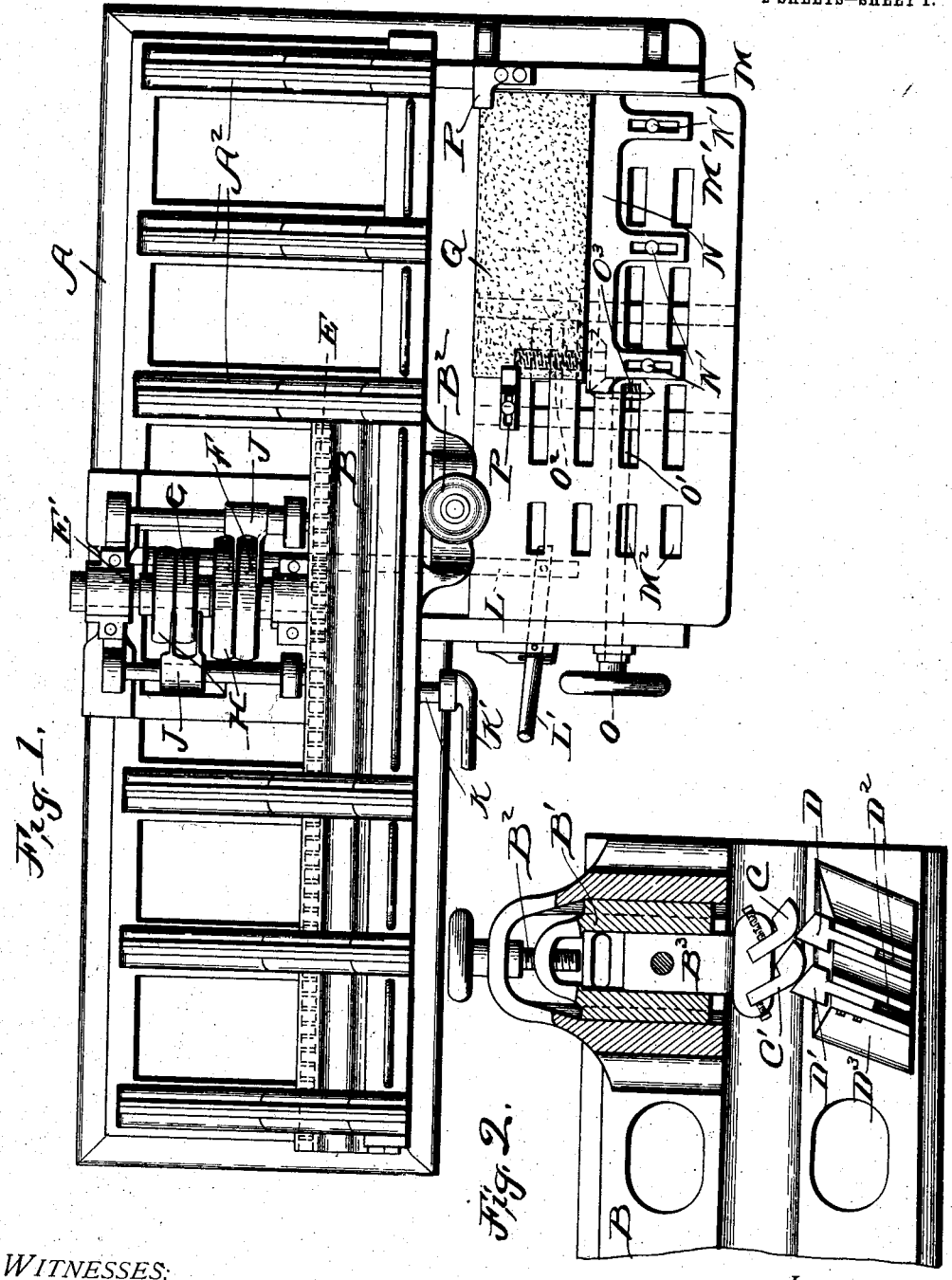
WITNESSES:
INVENTOR
F. S. Derr.
By
Attorneys

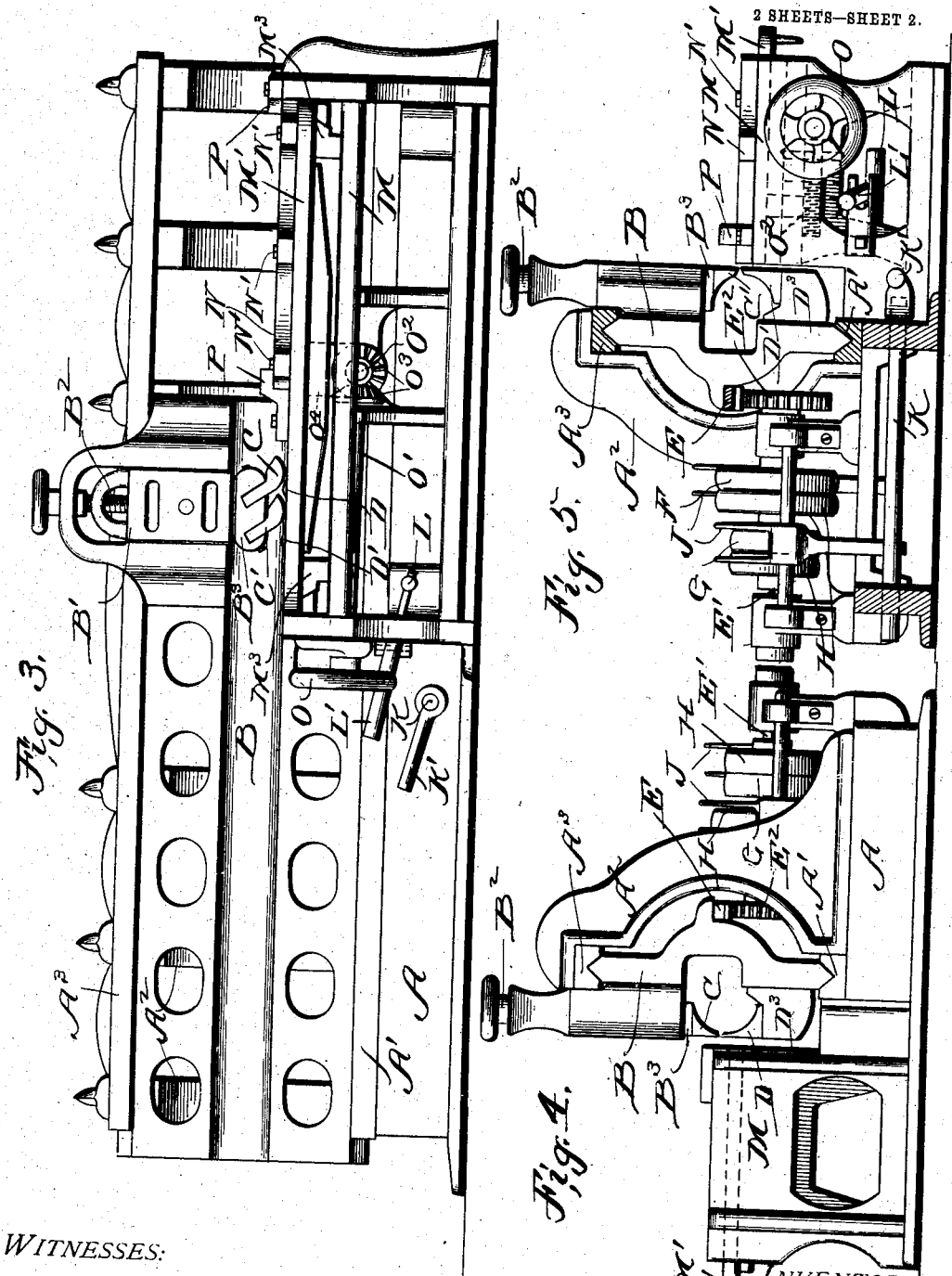

UNITED STATES PATENT OFFICE.

FRANKLIN S. DERR, OF ALLENTOWN, PENNSYLVANIA.

SLATE-CUTTING MACHINE.

No. 834,002.　　　Specification of Letters Patent.　　　Patented Oct. 23, 1906.

Application filed March 1, 1905. Serial No. 247,920.

*To all whom it may concern:*

Be it known that I, FRANKLIN S. DERR, a citizen of the United States, residing in Allentown, in the county of Lehigh and State of Pennsylvania, have invented a new and useful Slate-Cutting Machine, of which the following is a specification.

This invention relates to slate-cutting machines, and is especially designed to combine a molding and jointing machine.

The object of the invention is a machine which will cut joints much quicker than they are now cut on a roughing-bed and also one that is adapted for the cutting of molding in various shapes and sizes.

With these objects in view the invention consists of the novel features hereinafter described, pointed out in the claims, and shown in the accompanying drawings, in which—

Figure 1 is a plan view of my device. Fig. 2 is a detail view of a portion of one side, a table being removed to show the cutters and a portion of the cutter-head and carriage being in section. Fig. 3 is an elevation of the side of the machine carrying the cutters, the table being in place. Fig. 4 is a front end view. Fig. 5 is a view, partly in elevation and partly in cross-section, looking toward the front end of the machine, the rack-bar, tracks, and supporting-frame being in section.

In the drawings, A represents a suitable base having a lower grooved track A' and a plurality of upwardly-extending arms $A^2$, carrying an upper grooved track $A^3$ in alinement with the track A'. A traveling carriage B has its upper and lower edges beveled to fit the grooves of the tracks and moves horizontally therein. Adjacent its front end the carriage B carries a vertically-movable cutter-head B', adjusted by a screw $B^2$, and the head B' carries a cutter-block $B^3$. To the lower projecting end of the cutter-block $B^3$ are detachably secured a rough cutter C and immediately to the rear of the same a smooth cutter C'. As these cutters are detachable, they can be readily changed, so that any desired size or form of cutter may be used.

Stationary, with respect to the carrier B, cutters D and D' are held in suitable sockets $D^2$, formed in a cutter-block $D^3$, which is placed on the carriage below the cutter-head B'.

The cutters are of the usual stone-working type, and it will be noted from the drawings, Fig. 2, that the cutter C' is adjusted to extend slightly below the cutter C. The cutters C and C' act upon the upper face of the slate and the cutters D and D' act in the lower face. The cutters D and D' have forwardly-inclined cutting edges, and the slate is not only cut from above and below at the same time, but the cutters D and D' serve to support the slate so that it is cut smoothly, not broken, as is frequently the case when acted on by upper cutters only. It will also be noted that the rear tips or highest points of the cutters D and D' are above the lowest portion of the cutters C and C', so that the cutting edges of the two sets of cutters overlap, thus insuring a clean cut through the entire piece of slate, the second following set smoothing off all rough edges left by the first set and making a clean cut.

The carriage B is moved by means of a rack-bar E, secured to or formed along a longitudinal shoulder carried by the side of the carriage opposite the cutters. A shaft E' is journaled in suitable bearings on the base A and is provided with a gear-wheel $E^2$, adapted to mesh with the rack-bar E. On this shaft is also fixed a forward drive-pulley F and a reversing-pulley G, and adjacent each of these is a loose pulley H. Belt-shifters J are arranged adjacent each of these sets of pulleys, a slidable rod K, provided with a handle K', serving to shift the belt from the reversing-pulley G to its idle or loose pulley H and a similar rod L with a handle L' shifting a belt from the drive-pulley F to its loose pulley H. For sake of clearness in the drawings the belts are removed.

Adjacent the base A and on the side of the cutters is placed a table M, of any desired construction, provided with a slidable top M', which top is slotted, as shown at $M^2$ so that dust and chippings from the slate will fall through the said top and not accumulate thereon. The top M' slides on cleats or parallel tracks $M^3$, carried by the table or frame M, and travels toward and away from the cutters D. The table is provided with an adjustable guide N, locked in its adjusted position by set-screws N' of the usual construction. To move the table to and away from the cutters, I provide a hand-wheel O, having a shaft O' and a feed-screw $O^2$ at right angles to the shaft O', and the worm-gear and shaft carry intermeshing bevel-gears $O^3$. The top M' carries on its under face a depending portion $O^4$, (shown in dotted lines in Fig. 3,) through which the feed-screw $O^2$ extends, and when said feed-screw is rotated the top is caused to move toward or away from the carriage B, according to direction of rotation of the feed-screw O².

The slab of slate Q to be operated on is held upon the table M, resting on the slidable top M', and is held in position by the guide N and also by suitable buttons P, one of which is adjustable.

The advantages and operation of the device will be obvious from the above detail description of its various parts.

Having fully shown and described my invention, what I claim as new, and desire to secure by Letters Patent, is—

1. The combination with a reciprocating carriage, a vertically-adjustable cutter-head on the carriage, cutters carried by the said head, fixed cutters carried by the carriage below the cutters first mentioned, and means for holding a slab of slate in the path of the cutters.

2. The combination with a movable carriage, detachable and adjustable cutters carried thereby, coacting cutters carried by the carriage below the adjustable cutters, and a table having a slidable top adapted to bring a slab of slate into the path of the cutters.

3. A device of the kind described comprising a base, a carriage movable thereon, a cutter-head carried by the carriage, means for moving the cutter-head vertically with respect to the carriage, a cutter-block having sockets carried by the carriage, detachable cutters carried by the cutter-head and by the cutter-block, a table having a slidable top adapted to move toward and away from the path of the cutters, an adjustable guide on the table, and means for moving the table-top.

4. A device of the kind described comprising a movable carriage, an adjustable cutter-head, a cutter-block held by the head, smooth and rough cutters detachably carried by the block, the rough cutter being in advance of the smooth cutter, a cutter-block having sockets therein carried by the carriage below the cutter-head, cutters held in said sockets and adatped to coact with the first-mentioned cutters, and means for moving and holding material to be operated upon in the path of the cutters.

FRANKLIN S. DERR.

Witnesses:
CHARLES H. NAGLE,
G. J. S. KOHLER.